Nov. 18, 1952   E. E. SHERASKI   2,618,091
FISHING SIGNAL
Filed July 6, 1948                    2 SHEETS—SHEET 1
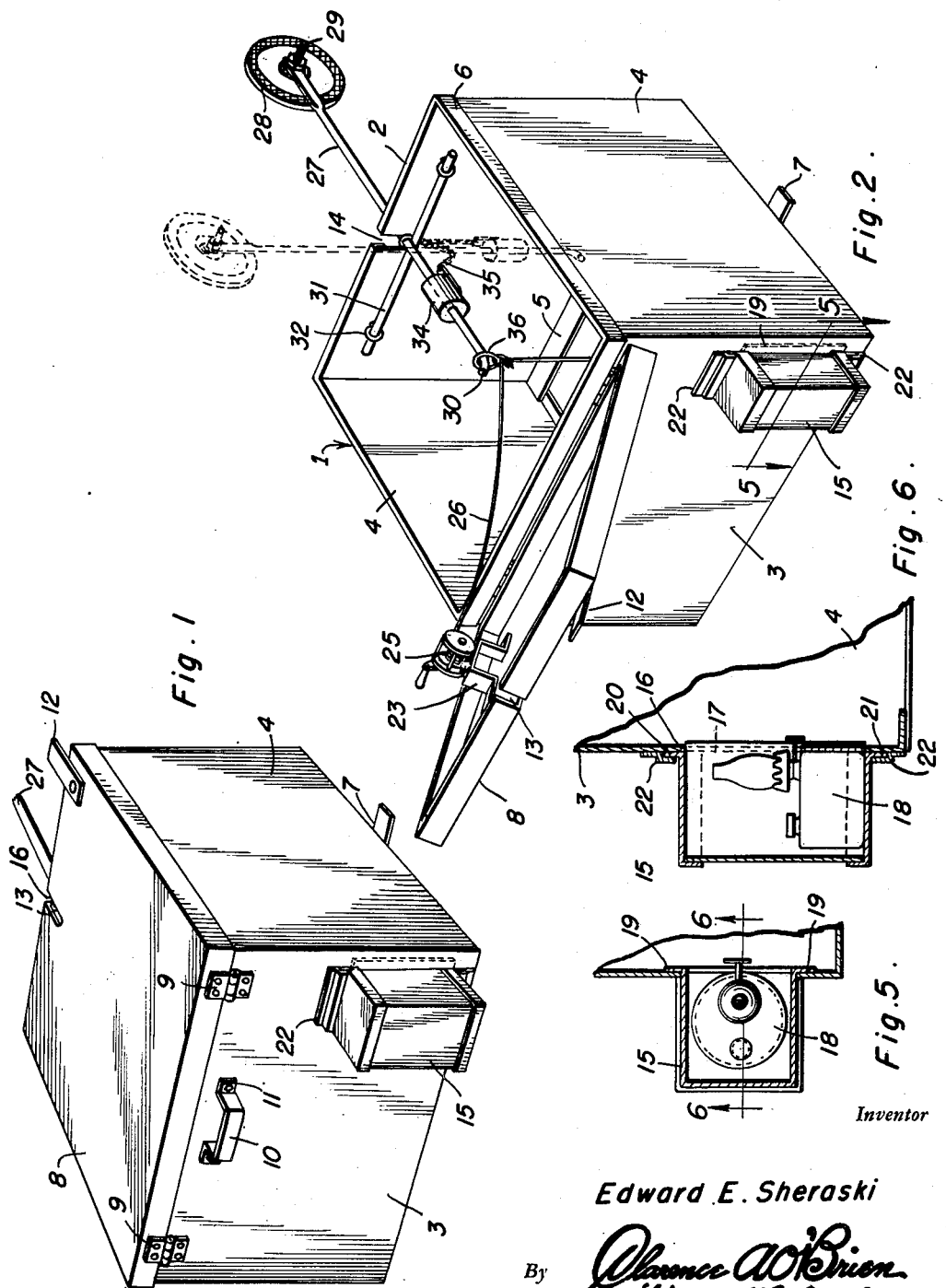
Inventor
Edward E. Sheraski Inventor
Edward E. Sheraski Patented Nov. 18, 1952

2,618,091

UNITED STATES PATENT OFFICE 2,618,091

FISHING SIGNAL

Edward E. Sheraski, Manitowoc, Wis.

Application July 6, 1948, Serial No. 37,174

3 Claims. (Cl. 43—17)

My invention relates to improvements in combined fishing and tip-up signalling devices for use in fishing through a hole in ice and signalling a bite or catch.

The invention is designed with the important objects in view of providing a simply constructed device of the character and for the purpose indicated which is substantially storm and freeze proof, can be adjusted to catch fish within a wide range of sizes and in deep water without false signalling, and is adapted to display a signal in a manner such that the same can be seen for a long distance.

Other objects are to provide a device of the character indicated adapted for fishing with a bobber on the line, without false signalling, and which is substantially fool-proof, comparatively inexpensive to manufacture, and not liable to get out of order from prolonged use.

Other and subordinate objects within the purview of my invention, together with the precise nature of my improvements, will be readily understood when the succeeding description and claims are read with reference to the drawings accompanying and forming part of this specification.

In said drawings:

Figure 1 is a view in perspective of my invention, in a preferred embodiment thereof;

Figure 2 is a similar view with the cover opened to illustrate how the fishing line is attached to the tip-up rod;

Figure 5 is a fragmentary view in horizontal section taken on the line 5—5 of Figure 2 and drawn to a larger scale;

Figure 6 is a view in vertical section taken on the line 6—6 of Figure 5.

Figure 3:
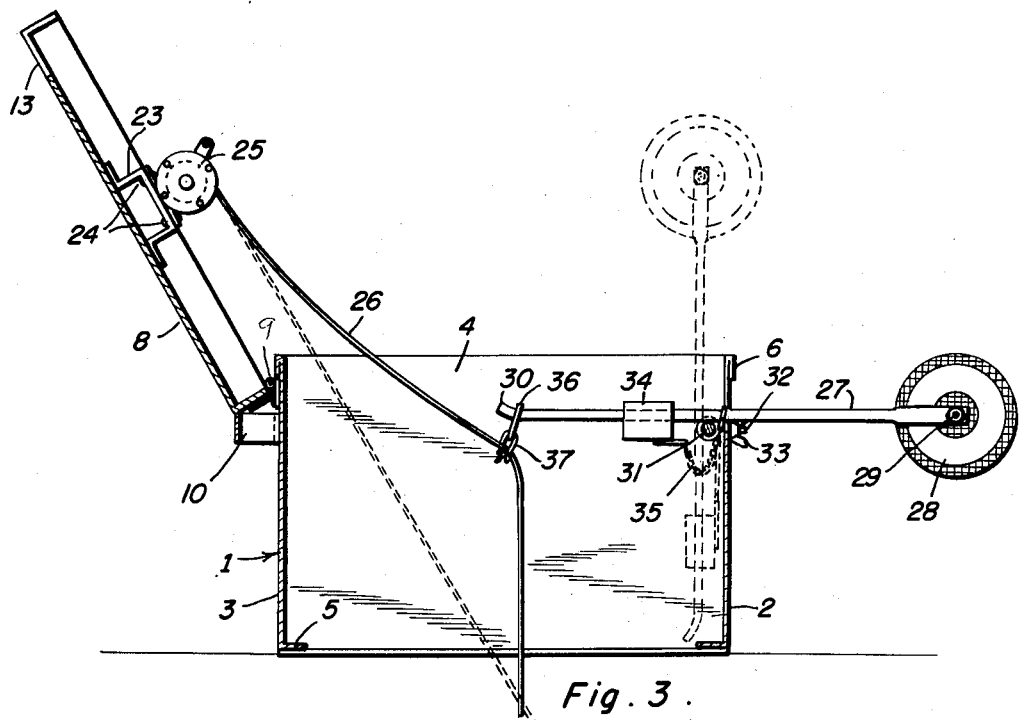
Figure 3 is a view in vertical section of the same taken on the line 3—3 of Figure 4.
Figure 4:
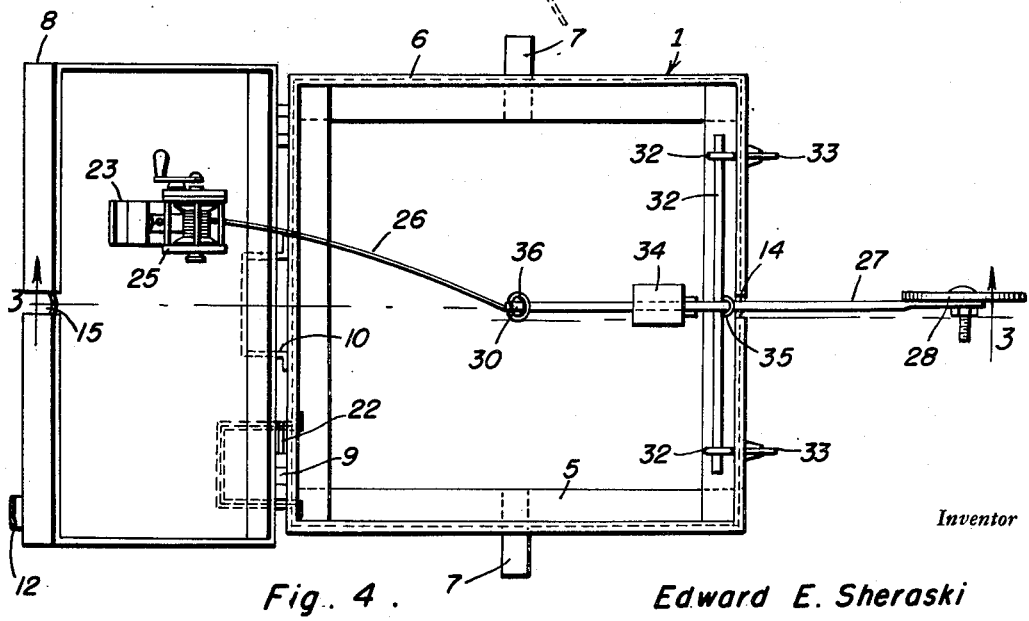
Figure 4 is a view in plan of the same.

Referring to the drawing by numerals, the basic component of my improved combination fishing and tip-up signalling device comprises a rectangular frame 1, preferably of sheet metal, including front, rear, and side walls 2, 3, 4, respectively, and which is open at its top and bottom and designed to be set over a hole in ice, not shown, with its bottom surrounding the hole. Internal bottom edge reinforcing flanges 5 are provided in the frame 1 and the top edge of said frame is bent over and crimped tight to form a rim 6 of double thickness of metal for reinforcing purposes. Short anchor bars 7 extend from the bottom edge of the frame 1 at opposite sides thereof for anchoring in the ice or otherwise attaching thereto to stabilize said frame 1 against slipping.

A rectangular, flanged cover 8 is hinged, as at 9, to the rear wall 3 to be swung into closing position over the rim 6 and fit tight against said rim, or, to be swung into open position at rest upon a U-shaped carrying handle 10 for the frame 1 riveted, as at 11, to the rear wall 3 in the vertical center thereof. A suitable corner handle 12 on the cover 8 is provided for use in opening and closing the same. A deep front edge notch 13 in the cover 8 is adapted to register with a similar vertical notch 14 in the upper edge of the front wall 2 when said cover is closed, said notches 13, 14 being in the transverse center of said cover 8 and front wall 2 and serving a purpose presently seen.

A rectangular sheet metal lamp housing 15 is attached to the rear wall 3 at a lower corner of the frame 1 opposite a suitable opening 16 in said wall and with a front upper opening 17 communicating with the interior of said frame 1 so that a lamp 18 may be inserted in said housing 15 through the opening 17 from the inside of the frame 1 and heat generated by the lamp issue from said opening 17 into the frame 1 to prevent the cover 8 from being frozen closed and other parts, presently described, in the frame 1 from becoming frozen so as to render the same useless. For attaching the lamp housing 15, side flanges 19 thereon are overlapped with the edges of the opening 16 on the inside of the frame 1, and top and bottom flanges 20, 21 are fitted in exterior guides 22 on the rear wall 3.

On the inside of the cover 8 and to one side of the notch 13, for a particular purpose presently seen, a U-shaped reel supporting bracket 23 is suitably secured to said cover for the attachment thereto, as by rivets 24, of a fishing line reel 25 from which a fishing line 26 may be extended through the bottom of the frame 1 for fishing purposes. The reel 25 may be of any suitable type.

A tip-up signalling device is provided for operation by a pull on the line to signal a bite or a catch and the principal element of which comprises a tip-up rod 27 having a front end signalling disk 28 bolted thereto, as at 29, and simulating a colored target so as to be rendered visible from a long distance, the rear end 30 of said rod being slightly curved for a purpose presently seen.

A cross rod 31 is suitably connected to said rod 27 intermediate the ends of the latter and extends horizontally along the front wall 2 parallel with the upper edge thereof slightly above the bottom of the notch 14 and on the inside of the frame 1 with its ends rotatably mounted in a pair of eye bolts 32 extended through said front wall 2 and equipped with wing nuts 33. By removing the wing nuts 33 and eye-bolts 32 and sliding the cross rod 31 out of said eye-bolts, these parts, together with the tip-up rod 27, may be detached for storing.

The tip-up rod 27 is adapted to be balanced to extend substantially horizontally out of the frame 1 with the signal disk 28 outside said frame and in a vertical plane and with the inner end 30 of said rod upturned and in the approximate vertical center of the frame 1.

A counterweight 34 is slidable on the tip-up rod 31 between the cross rod 31 and the inner end 30 of said rod 31 to balance said rod 31 in substantially horizontally extending position.

A chain 35 is attached at one end to the counterweight 34 and extended with slack therein under the cross rod 31, through the notch 14, with its other end attached to the tip-up rod 31 on the side of said cross rod 31 opposite the counterweight 34.

A ring 36 is provided for attachment of the fishing line 26 thereto, as at 37, in advance of the reel 25, and for hooking over the rear end 30 of the tip-up rod 27.

Referring now to the use and operation of the invention, with the frame 1 set, as described, the cover 8 open, and the tip-up rod 27 positioned, as described, in the notch 14 and substantially horizontally, the line 26 is attached, by the ring 36 to the rear end 30 of the tip-up rod 27. The counterweight 34 is then adjusted along the tip-up rod 27 to counterbalance the signalling disk 28 and balance said rod in substantially horizontal position under the weight of the line 26 depending from said rod. The cover 8 is then closed. With the tip-up signalling rod 27 thus set, a pull on the line 26, as from a bite or a catch, will pull the rear end 30 of the tip-up rod 27 downwardly, said rod rocking in the notch 14 until it is tilted sufficiently to cause the counterbalance weight 34 to slide toward the rear end 30 of said rod a limited distance determined by the slack in the chain 35, but, sufficiently to over-balance the signalling disk 28 and to swing said rod 27 into the notch 13 of the cover 8 and into vertical position. This displays the signalling disk 28 high above the frame 1 to signal a catch or a bite. In the meantime, the ring 36 has slid off the rear end 30 of the tip-up rod 27. At this point, a bite or catch having been signalled, the cover 8 may be opened and the line 26, or the reel 25, manipulated as may be required.

As will be seen, the tip-up signalling rod 27 may be precisely balanced, under the weight of long or short line 26 hanging from the rear end 30 thereof and to tip up under slight or heavy pull on the line. This provides for fishing for various sizes of fish, within a wide range of sizes, and even with a cork bobber, not shown, on the line. As will also be seen, the device is easy to set and use and substantially proof against wrong operation. The curved rear end 30 of the tip-up rod 27 prevents the line 26 from pulling off said rod until the counterweight 34 has slid into its limit of sliding movement toward over-balancing position and this prevents wrong operation of the tip-up signalling device. Since the tip-up rod 27 cannot tip into signalling position unless over-balanced, the device is proof against false signalling.

The foregoing will, it is believed, suffice to impart a clear understanding of my invention, without further explanation.

Manifestly, the invention as described is susceptible of modification, without departing from the inventive concept, and right is herein reserved to such modifications as fall within the scope of the appended claims.

Having described the invention, what is claimed as new is:

1. A combined fishing and signalling device comprising a frame having a vertical side and an open bottom for setting over a hole in ice, a signalling rod, means inside said frame pivotally mounting said rod intermediate its ends for vertical swinging movement from a horizontal position into an upright signalling position, a vertically extending notch formed in the upper portion of said side through which one end portion of said rod extends when the latter is in a horizontal position, a cover for said frame having a notch in one edge thereof through which said one end portion of the rod extends when said rod is in an upright signalling position to project out of the cover, a fishing line, means for attaching said line to the other end portion of said rod inside said frame to depend through said hole, said rod being adapted to swing from its horizontal position into its upright signalling position in response to a pull on said line, a counterweight slidably mounted on said rod inside said frame, said counter weight being adapted to move under the influence of gravity when the rod is swung from its horizontal position to over-balance the extended end of said rod, and a flexible connection between said counterweight and rod preventing said counterweight from sliding off said rod.

2. A combined fishing and signalling device according to claim 1, wherein said first-named means comprises eye members on said side of the frame, and a cross rod fixed to the signalling rod and rotatable in said eye members.

3. A combined fishing and signalling device comprising a frame having a vertical side and an open bottom for setting over a hole in ice, a signalling rod, means inside said frame pivotally mounting said rod intermediate its ends for vertical swinging from a horizontal position into an upright signalling position, a vertically extending notch formed in the upper portion of said side through which one end portion of said rod extends when the latter is in horizontal position, and a cover for said frame having a notch in one edge thereof into which said rod extends when said rod is in an upright signalling position to project out of the cover.

EDWARD E. SHERASKI.

REFERENCES CITED

The following references are of record in the file of this patent:

UNITED STATES PATENTS

| Number | Name | Date |
| --- | --- | --- |
| 188,503 | Davis | Mar. 20, 1877 |
| 962,420 | Dibbles | June 28, 1910 |
| 1,406,038 | Larsen | Feb. 7, 1922 |
| 1,590,960 | Seko | June 29, 1926 |
| 1,808,736 | Hernke | June 2, 1931 |
| 2,103,222 | Nelson | Dec. 21, 1937 |
| 2,136,864 | Paquette | Nov. 15, 1938 |